Dec. 10, 1940.  L. S. SANDERS  2,224,270

METHOD OF PREPARING CAMERA COPY FOR MULTICOLOR PRINTING

Filed March 15, 1938  2 Sheets-Sheet 1

INVENTOR.
Louis S. Sanders
BY Fay, Oberlin & Fay
ATTORNEYS.

Dec. 10, 1940.   L. S. SANDERS   2,224,270
METHOD OF PREPARING CAMERA COPY FOR MULTICOLOR PRINTING
Filed March 15, 1938   2 Sheets-Sheet 2
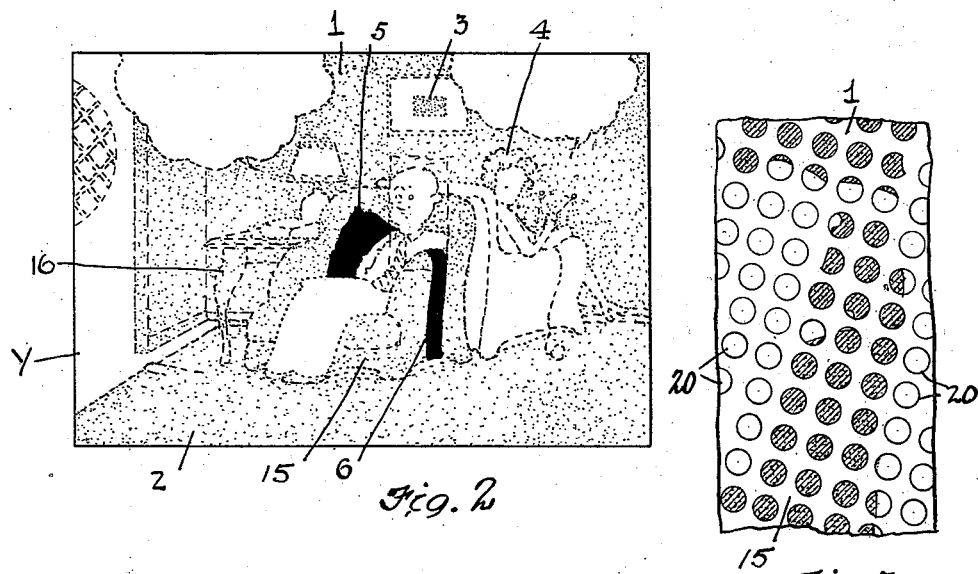
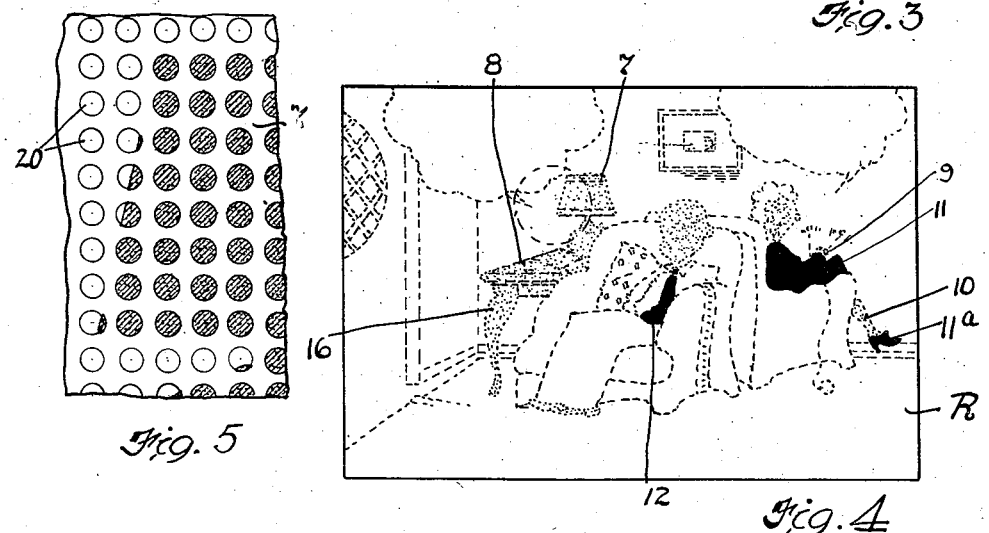
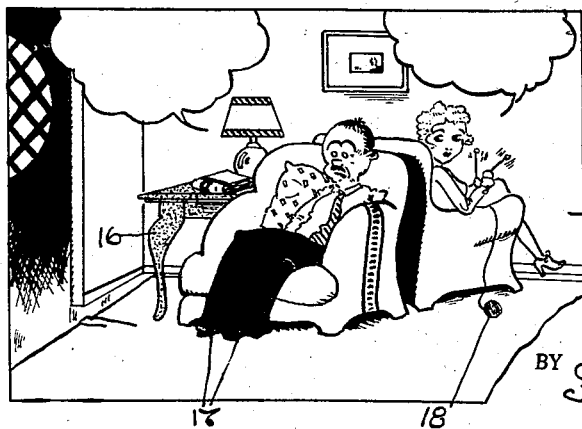
INVENTOR.
Louis S. Sanders.
BY Fay, Oberlin & Fay
ATTORNEYS.

Patented Dec. 10, 1940

2,224,270

UNITED STATES PATENT OFFICE 2,224,270

METHOD OF PREPARING CAMERA COPY FOR MULTICOLOR PRINTING

Louis S. Sanders, Lakewood, Ohio

Application March 15, 1938, Serial No. 195,983

6 Claims. (Cl. 41—41)

This invention relates, as indicated, to camera copy for multi-color printing and to methods of preparing such copy, but has reference more particularly to the preparation of such camera copy for use in making line and halftone color plates for comic supplements and the like.

Among other objects of the invention is the provision of a method whereby line and halftone color plates may be made quickly and easily, without the use of color filters, halftone screens or Ben Day shading machines, and without requirement of skilled, expensive labor.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:

Fig. 2 is a view of copy from which the negative for the yellow plate is produced;

Fig. 3 is a view, on a greatly enlarged scale, of a fragment of that portion of Fig. 2 which is enclosed within the dotted rectangle;

Fig. 4 is a view of copy from which the negative for the red plate is produced;

Fig. 5 is a view, on a greatly enlarged scale, of a fragment of that portion of Fig. 4, which is enclosed within the circle;

Fig. 8 is a view of copy from which the negative for the black plate is produced.

Referring more particularly to the drawings, and especially to Fig. 1, this view represents a picture, similar to those which are commonly found in the color comic supplements of Sunday newspapers, and printed with four different color plates, designated hereinafter as the yellow, red, blue and black plates, it being understood, however, that the invention is not limited in respect to the number of different color plates employed or to the use of plates of any particular color. The above colors have been chosen for purposes of illustration, principally for the reason that they are primary colors used in newspaper color work, and are those by means of which a large variety of tones and shades may be produced.

Figure 1:
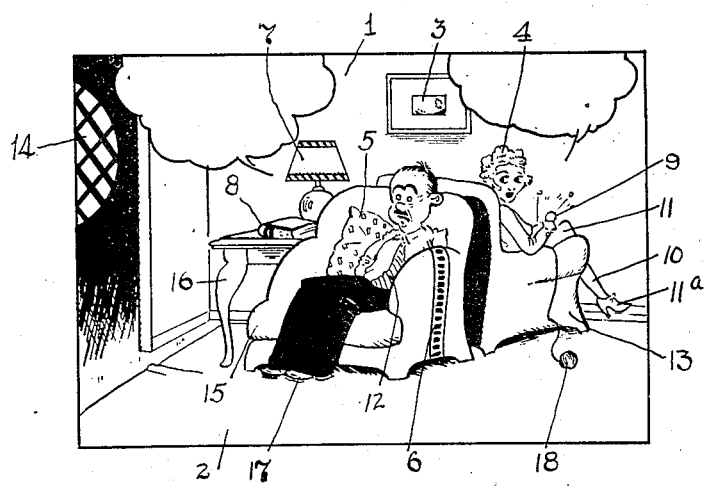
Fig. 1 is a view of a picture, similar to those which are commonly found in the color comic supplements of Sunday newspapers, but printed with color plates, which have been produced with the camera copy of the present invention as a basis.

In Fig. 1, in addition to the black parts which are shown in black, other parts appear in color as follows:

The walls 1, carpet 2, the picture 3 and the woman's hair 4 are in a light shade of yellow, while the pillow 5 and chair trim band 6 are in a solid or deeper shade of yellow. The lamp 7, book 8, faces of the individuals, hands 9 of the woman, and stockings 10 are in a light shade of red (pink), while the dress 11, shoe 11a, and tie 12 are in a deep or solid shade of red. The chair 13 is in light blue, the sky 14 is in deep blue, the chair 15 in green, and the table 16 in brown. The shoes 17 and ball of yarn 18 are in gray. The green tone is produced by a combination of blue and yellow shades, while the brown tone is produced by a combination of yellow, red and black.

In the preparation of the camera copy from which the negatives used in making the color plates are made, it is proposed to use a drawing medium which contains an invisible Ben Day, halftone or other recurring pattern, a number of which are readily available in the market, and all of which are admirably adapted for the purpose at hand. Such drawing media are described at some length in United States Letters Patent Nos. 1,709,600 and 1,778,397 and in a pending application of Maurice D. McIntosh, Serial No. 178,105. For half-tone effects, the medium described in the above application is preferred. It is to be understood, however, that any surface which can be drawn upon and which contains or bears such an invisible pattern, capable of being chemically developed for photographic purposes, may be employed as a drawing medium.

A key plate is then made which carries only the outlines of the various parts of Fig. 1, which are to appear in different colors. This key plate is then used to print the outlines of the drawing on four separate sheets of the drawing medium which has been described, and which are shown in broken lines in Figs. 2, 4, 6 and 8. In printing such outlines on such sheets with the key plate, a light blue ink which has no photographic value, that is, one that is invisible to the camera, is preferably employed.

The printed sheets are then treated in the following manner:

The artist will take the first sheet, shown in Fig. 2, and designated by reference character Y, and paint, or otherwise fill in, with India or similar black ink, those portions of the sheet which correspond with the solid yellow portions of the drawing of Fig. 1. Such portions are the pillow 5 and chair trim band 6. Those portions of the sheet Y which correspond with the light shade of yellow portions of the drawing of Fig. 1, are brought out as uniformly spaced black dots by developing such portions of the invisible pattern which the sheet bears or contains. Such portions are the walls 1, carpet 2, picture 3 and the hair 4, and, since the green tone of the chair 15 and the brown tone of the table 16 are formed of combinations of colors which include yellow, such chair and table are also developed along with the portions 1, 2, 3 and 4. The developer which is employed in any particular case will depend on the drawing medium used, and the developer may be applied by means of a brush or in any other suitable manner. If a drawing medium, such as described in Patent No. 1,709,600 is used, a saturated solution of caustic soda is used as the developer. If a medium, such as described in Patent No. 1,778,397 is used, a soluble sulphide is used, as the developer. If a medium such as described in McIntosh application, Serial No. 178,105, is used, any number of developers, depending upon the sensitizer used in forming the pattern, may be used.

The manner in which the pattern is developed is clearly illustrated in Fig. 3, wherein the invisible undeveloped portions of the pattern are indicated by the unshaded circles (dots) 20, and developed portions of the pattern by the shaded circles (dots) in the wall 1 and chair 15.

The sheet Y, as thus developed, is the camera copy from which the negative used in making the yellow color plate is made, and is set aside until the camera copy for the other plates is completed.

The artist will then take the second sheet shown in Fig. 4, and designated by reference character R, and paint or otherwise fill in, with India or similar black ink, those portions of the sheet which correspond with the solid red portions of the drawing of Fig. 1. Such portions are the dress 11, shoe 11a, and tie 12. Those portions of the sheet R, which correspond with the light red or pink portions of the drawing of Fig. 1, are brought out as uniformly spaced black dots by developing such portions of the invisible pattern which the sheet bears. Such portions are the lamp 7, book 8, faces of the individuals, hand 9 of the woman, and stocking 10, and, since the brown tone of the table 16 is formed of a combination of colors which includes red, such table is also developed along with the portions 7, 8, 9 and 10. The pattern is developed in precisely the same manner as the pattern on the sheet Y. The sheet R, as thus developed, is the camera copy from which the negative used in making the red color plate is made.

Figure 6:
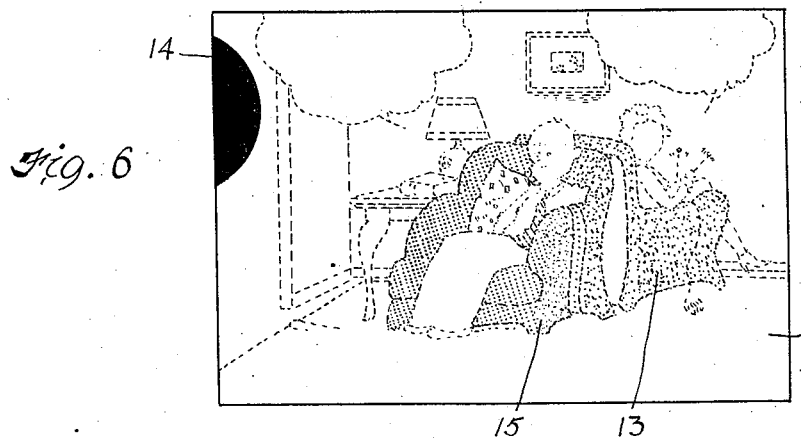
Fig. 6 is a view of copy from which the negative for the blue plate is produced.

The artist will then take the third sheet shown in Fig. 6, and designated by reference character B, and paint or otherwise fill in, with India or similar black ink, those portions of the sheet which correspond with the solid or deep blue portions of the drawing of Fig. 1. Such is the sky 14. Those portions of the sheet B, which correspond with the light blue portions of the drawing of Fig. 1, are brought out as uniformly spaced black dots by developing such portions of the invisible pattern which the sheet bears. Such is the chair 13, and, since the green tone of the chair 15 is formed of a combination of colors which includes blue, such chair 15 is also developed along with the portion 13. The pattern is developed in the same manner as the patterns on sheets Y and R, and the sheet B, as thus developed, is the camera copy from which the negative used in making the blue color plate is made.

Finally, the artist will take the fourth and last sheet, shown in Fig. 8, and designated by reference character B', and paint or otherwise fill in, with India or similar black ink, those portions of the sheet which correspond with the solid black portions of the drawing of Fig. 1. Those portions of the sheet B', which correspond with the gray portions of the drawing of Fig. 1, are brought out as uniformly spaced black dots by developing such portions of the invisible pattern which the sheet bears. Such portions are the shoes 17 and ball of yarn 18, and, since the brown tone of the table 16 is formed of a combination of colors which includes black, such table is also developed along with the portions 17 and 18. The pattern is developed in the same manner as the patterns on sheets Y, R and B, and the sheet B', as thus developed, is the camera copy from which the negative used in making the black color plate is made.

Using the sheets as camera copy, negatives are made therefrom in the usual manner, and with these negatives, zinc or copper color printing plates are printed and etched. In making such color plates, it is thus not required that color filters, halftone screens or Ben Day shading methods, devices or mediums be used. To insure perfect registry of colors, the camera with which the negatives are made, is locked, so as to preserve the focus for all of the sheets which are photographed thereby.

Figures 7, 9:
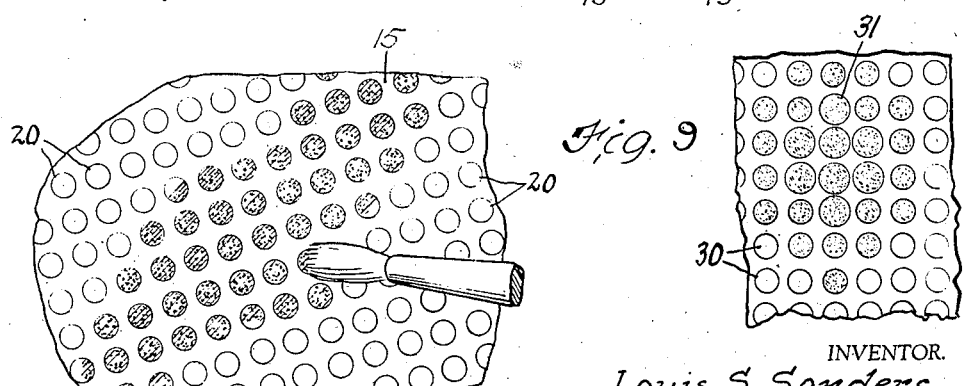
Fig. 7 is a view, on a greatly enlarged scale, of a fragment of that portion of Fig. 6, which is enclosed within the circle.
Fig. 9 is a view, on a greatly enlarged scale, showing how gradations in color may be produced by the use of a special medium for the camera copy.

To avoid moire effects, an angled series of patterns is employed, that is to say, the dots on each of the sheets are arranged in rows which are angularly related to the rows on the other sheets, as will be apparent from Figs. 3, 5 and 7. The pattern of sheet B is not shown, but it will be understood that the dots are arranged in rows which are inclined at an angle to those in the other three sheets.

In using drawing media, such as described in Patents 1,709,600 and 1,778,397, it is not possible to produce halftone effects, since the dots forming the patterns are not capable of enlargement. Such effects may, however, be secured, by using a drawing medium, such as described in the aforesaid McIntosh application, and which are capable of enlargement by application of the developer solution to the sheet for progressively increasing periods. A fragment of such a sheet is shown in Fig. 9, wherein the dots 31 in the center and adjacent to such center are larger than the bordering dots 30. Such a medium is particularly effective in the present method, since gradations in color may be secured by the simple expedient of developing portions of the sheet for longer periods, as may be desired.

It will be apparent from the foregoing, that a method has been provided whereby line and halftone color plates may be made quickly and easily, without the use of color filters, halftone screens or Ben Day shading machines. It will also be apparent, since such equipment is not required, that relatively unskilled and inexpensive labor may be employed in the preparation of the color plates, thereby opening fields for color work which have not heretofore been explored.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. The method of preparing camera copy for multicolor printing, which consists in providing a plurality of sheets of a drawing medium containing an invisible regularly recurring pattern, said sheets corresponding in number to the number of primary colors involved in the final image to be printed, applying to each of said sheets lines which separate objects of different colors, said lines having substantially no photographic value, but sufficiently visible to the artist to serve as guide lines, and applying to portions of said sheets representing color a developing agent, whereby said patterns are brought to visibility.

2. The method of preparing camera copy for multicolor printing, which consists in providing a key plate bearing the outlines of the various objects in the final image to be printed, providing a plurality of sheets of a drawing medium containing an invisible regularly recurring pattern, said sheets corresponding in number to the number of primary colors involved in the final image to be printed, printing said outlines in light blue ink of substantially no photographic value but sufficiently visible to serve as guide lines on said sheets by means of said key plate, and applying to portions of said sheets representing color a developing agent, whereby said pattern are brought to visibility at such portions of said sheets.

3. The method of preparing camera copy for making a color plate, which consists in providing a drawing surface containing a regularly recurring pattern having no photographic value, applying to said surface color separation outlines having substantially no photographic value, but sufficiently visible to the artist to serve as guide lines, applying waterproof black ink to portions of said surface which represent a deep color and developing portions of said pattern at such portions of said surface which represent lighter shades of said color.

4. The method of preparing camera copy for making a color plate, which consists in providing a drawing medium containing an invisible pattern, applying to said medium lines which separate objects of different color, said lines having substantially no photographic value, but sufficiently visible to the artist to serve as guide lines, applying to portions of said medium which represent a solid color a black waterproof pigment, and applying to other portions of said medium which represent lighter shades of said color a developing agent, whereby said pattern is brought to visibility at such other portions of said medium.

5. The method of preparing camera copy for multicolor printing, which consists in providing a plurality of sheets of a drawing medium containing an invisible regularly recurring pattern, said sheets corresponding in number to the number of primary colors involved in the final image to be printed, applying to each of said sheets lines which separate objects of different colors, said lines having substantially no photographic value, but sufficiently visible to the artist to serve as guide lines, applying to said sheets at places representing solid color a black waterproof ink, and applying to other portions of said sheets representing lighter shades of color a developing agent, whereby said pattern is brought to visibility at such other portions of said sheets.

6. The method of preparing camera copy for multicolor printing, which consists in providing a key plate bearing the outlines of the various objects in the final image to be printed, providing a plurality of sheets of a drawing medium containing an invisible regularly recurring pattern, said sheets corresponding in number to the number of primary colors involved in the final image to be printed, printing said outlines in light blue ink of substantially no photographic value but sufficiently visible to the artist to serve as guide lines on said sheets by means of said key plate, applying to said sheets at places representing solid color a black waterproof ink, and applying to other portions of said sheets representing lighter shades of color a developing agent, whereby said pattern is brought to visibility at such other portions of said sheets.

LOUIS S. SANDERS.